United States Patent [19]

Ishizuka

[11] Patent Number: 4,870,607
[45] Date of Patent: Sep. 26, 1989

[54] ERROR DETECTION CARRIED OUT BY THE USE OF UNUSED MODULO-M CODE

[75] Inventor: Akira Ishizuka, Tokyo, Japan

[73] Assignee: NEC Corporation, Tokyo, Japan

[21] Appl. No.: 69,095

[22] Filed: Jul. 2, 1987

[30] Foreign Application Priority Data

| Jul. 3, 1986 | [JP] | Japan | 61-155001 |
| Jul. 3, 1986 | [JP] | Japan | 61-155002 |
| Jul. 3, 1986 | [JP] | Japan | 61-155003 |
| Jul. 3, 1986 | [JP] | Japan | 61-155004 |
| Jul. 3, 1986 | [JP] | Japan | 61-155005 |
| Jul. 3, 1986 | [JP] | Japan | 61-155006 |
| Jul. 3, 1986 | [JP] | Japan | 61-155007 |
| Jul. 3, 1986 | [JP] | Japan | 61-155008 |
| Jul. 3, 1986 | [JP] | Japan | 61-155009 |

[51] Int. Cl.$^4$ .............................. G06F 11/10
[52] U.S. Cl. ............................ 364/739; 371/53
[58] Field of Search ............ 371/53, 54; 364/739, 364/737, 724; 235/304, 307

[56] References Cited

U.S. PATENT DOCUMENTS

| 3,602,704 | 8/1971 | Akushsky | 364/739 |
| 3,816,728 | 6/1974 | Chen | 364/739 |
| 3,873,820 | 3/1975 | Parr | 364/739 |
| 4,181,969 | 1/1980 | Smith | 364/739 |

OTHER PUBLICATIONS

G. G. Landon Jr. et al, "Concurrent Error Detection for Group Look-ahead Binary Adders," IBM Journal of Research and Development, Sep. 1970, pp. 563-573.
F. F. Sellers, Jr. et al, "Error Detecting Logic for Digital Computers," McGraw Hill Co., Inc., New York, 1968, pp. 41-45 and pp. 76-80.

Primary Examiner—Michael R. Fleming
Attorney, Agent, or Firm—Foley & Lardner, Schwartz, Jeffery, Schwaab, Mack, Blumenthal & Evans

[57] ABSTRACT

In an error detection circuit for use in combination with a logic unit to detect an error by monitoring a binary signal of k bits in a logic circuit which carries out a predetermined operation with respect to a modulus number, where m is equal to $2^k-1$, zeroth through (m−1)-th codes are assigned to the predetermined operation while an m-th code is prepared as a specific code to monitor and to detect an error in the error detection circuit. The logic circuit may be either one of a modulo-m register circuit, a modulo-m coincidence circuit, and a modulo-m calculation circuit. Alternatively, at least two of the modulo-m circuits may be combined to form the logic circuit. If m=3, the specific code may be (1, 1).

31 Claims, 11 Drawing Sheets

ERROR DETECTION CARRIED OUT BY THE USE OF UNUSED MODULO-M CODE

BACKGROUND OF THE INVENTION

This invention relates to an error detection circuit and an error detection method for use in an information processing system to detect or check an error which may be present in binary signals.

An information processing system of the type described comprises a processing unit operable in response to binary input signals to carry out predetermined calculation or processing in a digital manner and to produce a result of calculation or processing as a binary output signal. It is necessary to guarantee that each of the binary input and output signals is not erroneous in order to carry out such calculation or processing with a high reliability. For this purpose, an error detection circuit is included in the information processing system and is operable in parallel to the processing unit.

A conventional error detection circuit of the type described checks or detects an error in a manner described by G. G. Landon Jr. et al in "Concurrent Error Detection for Group Look-ahead Binary Adders" (IBM Journal of Research and Development, September 1970, pages 563–573) and by F. F. Sellers, Jr. et al in "Error Detecting Logic for Digital Computers" (McGraw Hill Co., Inc., New York, 1968, pages 41–45 and pages 76–80).

More particularly, the error detection circuit at first processes the binary input signals into residues with respect to a modulus number 3 and thereafter carries out calculation modulo 3 to produce an estimation value which is represented modulo 3 and which may be called a modulo-3 estimation value hereinafter. The calculation itself may be identical with the predetermined calculation of the processing unit. Under the circumstances, the modulo-3 estimation value has to be coincident with the binary output signal which is expressed modulo 3 when no error occurs in the binary input and output signals. Otherwise, an error takes place in the binary output signal, as mentioned in the above-referenced books.

In the error detection circuit, error detection may be carried out in connection with both the binary input signals in the above-mentioned manner, because the binary input signal might already accompany an error.

At any rate, it is to be noted that the residues and the modulo-3 estimation value are dealt with in the error detection circuit in the form of a binary code of first and second bits which may be recognized as higher and lower significant bits, respectively. In this event, each of the residues and the modulo-3 estimation value can represent zeroth through second binary codes (0, 0), (0, 1), and (1, 0) which may be called defined codes, respectively. This shows that no consideration is paid about a third binary code (1, 1) which may be called an undefined code. This results in a decrease of an error detection rate and in a difficulty of locating an error, as will presently become clear.

For example, let an error or fault take place such that a certain one of the defined codes is undesirably changed to the undefined code in the error detection circuit. Such an error is not always checked or detected in the error detection circuit. In addition, it is difficult to analyze and locate the error changed from the defined codes to the undefined code because the probability of detecting such errors completely depends on a logical structure of the error detection circuit. This shows that such errors might be detected by some logical structure but is not detected by the other logical structure.

A plurality of error detection circuits might be connected from a first stage to a final one so as to successively carry out calculations modulo 3. In the error detection circuits, no information is transmitted from a preceding one of the stages to the following one even when any error takes place in the preceding stage. Therefore, it is difficult to trace or follow a flow of an erroneous data signal in the error detection circuits. Moreover, each error detection circuit often produces an unspecified output signal in response to the undefined code. Such an unspecified output signal is troublesome to handle in designing a large scale integrated circuit. Theoretically, the error detection circuit (mod 3) may be superseded by an error detection circuit (mod m) wherein m is representative of $2^k - 1$ where k is an integer greater than unity, although such an error detection circuit (mod m) has not actually been present.

SUMMARY OF THE INVENTION

It is an object of this invention to provide an error detection circuit and method which are capable of improving an error detection rate and precisely locating an error.

It is another object of this invention to provide an error detection circuit and method of the type described, which can readily monitor a flow of an erroneous data signal.

It is still another object of this invention to provide an error detection circuit and method of the type described, which can avoid an unspecified output signal even on the occurrence of an undefined code, such as (1, 1) in an estimated value or residues (mod 3).

It is another object of this invention to provide an error detection circuit of the type described, which can be extended to calculation modulo m where m is equal to $2^k - 1$ wherein k is representative of an integer greater than unity.

According to an aspect of this invention, there is provided an error detecting method of detecting an error in a binary signal of k bits which is made to correspond to zeroth through (m−1)-th codes when the k bits are represented with respect to a modulus number m, where k is a positive integer greater than unity and m is equal to two to the k-th power minus one ($2^k - 1$). The method comprises the steps of monitoring an m-th code with respect to the modulus number m and detecting the error in the binary signal on the occurrence of the m-th code.

According to another aspect of this invention, there is provided an error detecting circuit which is for use in detecting an error in a binary signal of k bits which is made to correspond to zeroth through (m−1)-th codes when the k bits are represented with respect to a modulus number m, where k is an integer greater than unity and m is equal to two to the k-th power minus one ($2^k - 1$) The error detecting circuit comprises monitoring means responsive to the binary signal for monitoring an m-th code with respect to the modulus number m and detecting means coupled to the monitoring means for detecting the error in the binary signal on the occurrence of the m-th code.

BRIEF DESCRIPTION OF THE DRAWING

FIG. 6 is a circuit diagram for exemplifying a moulo-3 coincidence circuit applicable to the error detecting circuit illustrated in FIG. 2;

FIG. 7 is a circuit diagram for exemplifying two types of modulo-3 registers applicable to the error detecting circuit illustrated in FIG. 2;

FIG. 8 is a block diagram of a logic section including an error detecting circuit according to a first embodiment of this invention;

FIG. 9 is a block diagram of a logic section including an error detecting circuit according to a second embodiment of this invention;

FIG. 10 is a block diagram of a logic section including an error detecting circuit according to a third embodiment of this invention;

FIG. 11 is a block diagram for use in describing an error detecting circuit according to a fourth embodiment of this invention;

FIG. 12 is a block diagram of a logic section including an error detecting circuit according to a fifth embodiment of this invention;

FIG. 13 is a block diagram of a logic section including an error detecting circuit according to a sixth embodiment of this invention; and FIG. 14 is a block diagram of a logic section carrying out error detection according to this invention.

DESCRIPTION OF THE PREFERRED EMBODIMENTS

Figure 1:
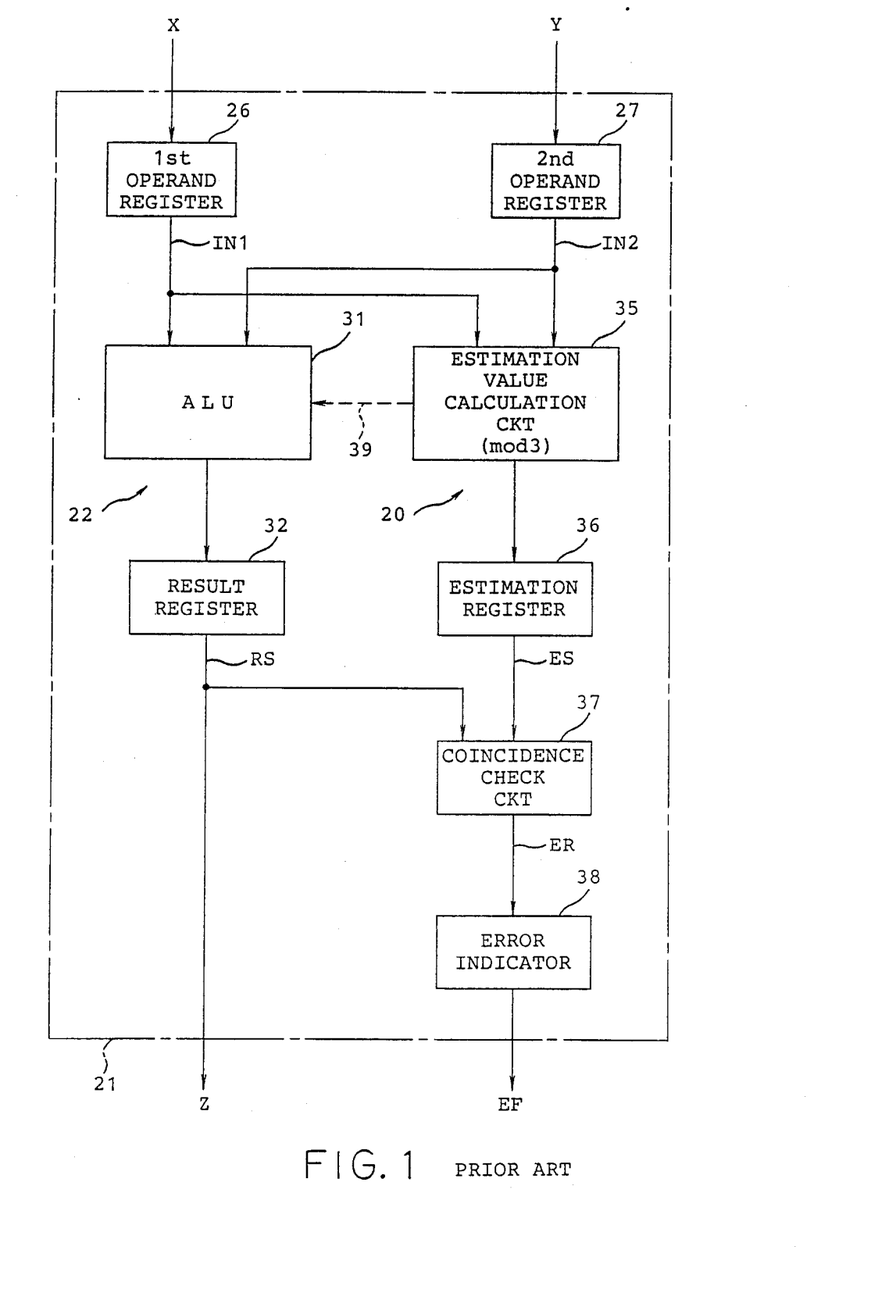
FIG. 1 is a block diagram of a logic section including a conventional error detecting circuit.

Referring to FIG. 1, description will be directed for a better understanding of this invention to a conventional error detecting circuit 20 which is included in a logic section 21 of an information processing system and which is operable in relation to an arithmetic section 22. First and second binary signals X and Y are supplied from a pre-processing circuit (not shown) to the logic section 21 and stored in first and second operand registers 26 and 27, respectively. The first and the second binary signals X and Y have a predetermined number of bits and are delivered as first and second binary input signals IN1 and IN2 to the logic section 21 and the error detection circuit 20 in parallel.

The arithmetic section 22 comprises an arithmetic logic unit 31 which carries out a predetermined calculation in response to the first and the second input signals IN1 and IN2 to produce a result Z of calculation in a binary fashion. The predetermined calculation may be either one of addition, subtraction, multiplication, and division. The result Z of calculation is stored in a result register 32 and is sent to an outside circuit (not shown) as a binary result signal RS.

The first and the second input signals IN1 and IN2 are delivered to a modulo-3 estimation value calculation circuit 35 of the error detection circuit 20. The modulo-3 estimation value calculation circuit 35 carries out, with respect to a modulus number 3, calculation carried out in the arithmetic logic unit 31. To this end, the first and the second binary input signals IN1 and IN2 are at first processed modulo-3 by the modulo-3 estimation value calculation circuit 35 into first and second modulo-3 processed values, respectively. Each modulo-3 processed value represents a residue appearing when the first and the second input signals IN1 and IN2 are expressed with respect to the modulus number 3, as described in the above-referenced books. The modulo-3 calculation is carried out by the use of the first and the second processed values to produce a modulo-3 estimation value which may be referred to as a modulo-3 estimation value and which has to be coincident with the result of calculation as long as no error takes place.

The modulo-3 estimation value is stored in a modulo-3 estimation register 36 and is sent as a modulo-3 estimation value signal ES to a modulo-3 coincidence check circuit 37. The modulo-3 coincidence check circuit 37 is supplied from the result register 32 with the binary result signal RS which is rendered into a modulo-3 result signal. The modulo-3 coincidence check circuit 37 compares the modulo-3 result signal with the modulo-3 estimation value signal ES to detect whether or not the modulo-3 result signal is coincident with the modulo-3 estimation value signal ES and to produce an error signal ER on detection of incoincidence between the modulo-3 result signal and the modulo-3 estimation value signal ES. The error signal ER is stored in an error indicator 38 and is thereafter sent as an error flag EF to the outside circuit. The error signal ER is kept in the error indicator 38 until reception of a release or reset signal from the outside circuit. Thus, error check and detection operation is executed in the logic section 21.

In practice, such error check and detection operation is carried out not only about the result of calculation but also about an intermediate result of calculation, as symbolized by a broken line 39 in FIG. 1, and the first and the second binary input signals IN1 and IN2.

The illustrated error detecting circuit 20 is disadvantageous as pointed out in the preamble of the instant specification.

(Mathematical Analysis of the modulo-m Error Detection)

Description will be made about a mathematical theory of error detection which is partly described in the above-mentioned books. All of the numbers can be expressed with respect to a modulus number m into codes given by:

$$[N, r_m(N)],$$

where N is an integer which can optionally be selected and $r_m(N)$ is a residue resulting from a division of N by the modulus number m. Under the circumstances, addition and multiplication between two numbers $N_1$ and $N_2$ are given modulo m by:

$$[N_1, r_m(N_1)] + [N_2, r_m(N_2)] = [N_1 + N_2, r_m(N_1) \boxplus r_m(N_2)],$$

$$\text{and } [N_1, r_m(N_1)] \times [N_2, r_m(N_2)] = [N_1 \times N_2, r_m(N_1) \boxtimes r_m(N_2)],$$

respectively, where ⊞ and ⊠ are representative of addition and multiplication modulo m, respectively.

If the following equations hold:

$$r_m(N_1+N_2)=r_m(N_1) \boxplus r_m(N_2),$$

and $r_m(N_1 \times N_2)=r_m(N_1) \boxplus r_m(N_2),$ each of the above-mentioned sum and product forms another code word which is different from the codes specified by $N_1$ and $N_2$.

Error detection is possible by checking whether or not the sum $r_m(N_1+N_2)$ and the product $r_m(N_1 \times N_2)$ are different from desired codes, respectively.

When the modulus number m is equal to two to the k-th power minus one $(2^k-1)$, namely, 3, 7, 15, ..., every number or element (mod m) can be expressed by a minimum number of k bits, where k is an integer greater than unity. This shows that the modulus number $2^k-1$ is effective in comparison with the other modulus numbers. Therefore, the modulus number $m=2^k-1$ is very often used.

For simplicity of description, let the modulus number m be equal to $2^2-1$, namely, 3. In this case, each element (mod 3) takes either one of 0, 1, and 2 which are expressed into two-bit sets or codes (0, 0), (0, 1), and (1, 0), respectively. Thus, three of four codes are assigned to three elements modulo 3.

Now, consideration will be made about two binary numbers $N_a$ and $N_b$. The binary numbers $N_a$ and $N_b$ can be expressed modulo 3 by:

$$N_a = k_1 \times 3 + r_3(N_a), \quad (1)$$

and $$N_b = k_2 \times 3 + r_3(N_b).$$

A sum and a product of the binary numbers are given by:

$$N_a+N_b=(k_1+k_2)\times 3+r_3(N_a)+r_3(N_b)$$

and $$N_a \times N_b=(k_1 \times k_2)\times 9+[k_1 \times r_3(N_b)+k_3 \times r_3(N_a)]\times 3+r_3(N_a)\times r_3(N_b).$$

Therefore, following equations hold:

$$r_3(N_a+N_b)=r_3(r_3(N_a)+r_3(N_b)) \quad (2)$$

and $r_3(N_a \times N_b)=r_3(r_3(N_a) \times r_3(N_b)). \quad (3)$

Herein, let an adder (mod 3) be formed so that the following equations hold:

$$\begin{aligned}(0, 0) &\boxplus (0, 0) = (0, 0), (0 + 0 = 0) \\ (0, 0) &\boxplus (0, 1) = (0, 1), (0 + 1 = 1) \\ (0, 0) &\boxplus (1, 0) = (1, 0), (0 + 2 = 2) \\ (0, 1) &\boxplus (0, 1) = (1, 0), (1 + 1 = 2) \\ (0, 1) &\boxplus (1, 0) = (0, 0), (1 + 2 = 0) \\ (1, 0) &\boxplus (1, 0) = (0, 1), (2 + 2 = 1)\end{aligned} \quad (4)$$

Under the circumstances, Equation (2) is rewritten in consideration of Equation (4) into:

$$r_3(N_a+N_b)=r_3(N_a) \boxplus r_3(N_b). \quad (5)$$

Likewise, a multiplier (mod 3) is formed so that the following equations are satisfied:

$$\begin{aligned}(0, 0) &\boxtimes (0, 0) = (0, 0), (0 \times 0 = 0) \\ (0, 0) &\boxtimes (0, 1) = (0, 0), (0 \times 1 = 0) \\ (0, 0) &\boxtimes (1, 0) = (0, 0), (0 \times 2 = 0) \\ (0, 1) &\boxtimes (0, 1) = (0, 1), (1 \times 1 = 1) \\ (0, 1) &\boxtimes (1, 0) = (1, 0), (1 \times 2 = 2) \\ (1, 0) &\boxtimes (1, 0) = (0, 1), (2 \times 2 = 1)\end{aligned} \quad (6)$$

Equation (3) is rewritten in consideration of Equation (6) into:

$$r_3(N_a \times N_b)=r_3(N_a) \boxtimes r_3(N_b). \quad (7)$$

Thus, an adder circuit (mod 3) and a multiplier (mod 3) can be checked and detected by the use of Equations (5) and (7). More specifically, the binary numbers $N_a$ and $N_b$ are expressed modulo 3 on checking the adder circuit (mod 3) to obtain residues $r_3(N_a)$ and $r_3(N_b)$, respectively. Subsequently, the residues $r_3(N_a)$ and $r_3(N_b)$ are expressed into two-bit sets or codes (a1, a2) and (b1, b2), respectively. Thereafter, the residues $r_3(N_a)$ and $r_3(N_b)$ are added to each other modulo 3 to produce a modulo-3 estimation sum value (c1, c2).

On the other hand, the binary numbers $N_a$ and $N_b$ are added to each other in a usual manner to calculate a sum $N_c$. The sum $N_c$ is expressed modulo 3 to obtain a residue $r_3(N_c)$ which is represented by two bit codes (d1, d2). Each two-bit code (d1, d2) has to be coincident with the modulo-3 estimation sum value (c1, c2) without any error. Otherwise, the two-bit code (d1, d2) is incoincident with the modulo-3 estimation sum value (c1, c2). Thus, error check and detection is possible by comparing the code (d1, d2) with the modulo-3 estimation sum value (c1, c2).

It is possible to check the multiplier (mod 3) between the binary numbers $N_a$ and $N_b$ in a similar manner, although description is omitted from the instant specification.

It is to be noted here that only three of the four codes of two bits are used or defined as mentioned above with the remaining single code of (1, 1) unused. This shows that the code of (1, 1) is undefined as usual. In this connection, the three codes of (0, 0), (0, 1), and (1, 0) may be called defined codes while the code of (1, 1) may be called an undefined code.

An error might often take place such that the defined codes are undesirably changed to the undefined code. No consideration has conventionally been made about occurrence of such an error. As a result, a modulo-3 code which appears after an error location does not logically make sense because, no modulo-3 code is uniquely determined after the occurrence of the undefined code of (1, 1). More specifically, it is possible to design each of the adders (mod 3) and the multiplier (mod 3) in different ways. In such adders (mod 3) and multiplier (mod 3) formed by the different ways, different modulo-3 output signals are produced by each of the adders (mod 3) and the multipliers (mod 3) on occurrence of the undefined code (1, 1). In other words, the output signals are changed when the adders (mod 3) and the multipliers (mod 3) have different logical structures.

It has been found that modulo-m error detection can be improved by considering the undefined code of (1, 1), as will become clear, although the above description is restricted to a calculation circuit, such as a modulo-3 adder, namely, an adder (mod 3) and a modulo-3 multiplier, namely, a multiplier (mod 3), similar modulo-3 error detection is possible in a modulo-3 coincidence circuit, such as 37 in FIG. 1, and a modulo-3 register, such as 36 in FIG. 1.

Figure 2:
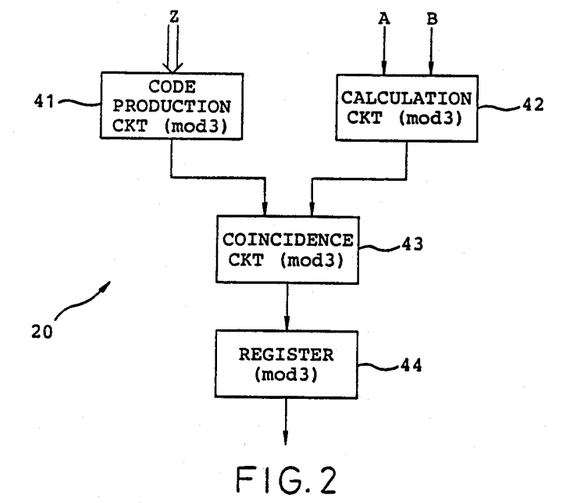
FIG. 2 is a block diagram of an error detecting circuit which is capable of carrying out error detection according to the invention.

Referring to FIG. 2, modulo-m error detection according to this invention will be described, although the description will mainly be restricted to modulo-3 error detection. Therefore, it may be assumed that the modulus number m is equal to three. In FIG. 2, an error detecting circuit depicted at 20 is connected to a pre-processing circuit (not shown) which carries out the previous calculation in response to first and second binary signals X and Y (not shown) to produce a binary result signal Z which is representative of a result of calculation and which will often be called a binary result signal hereinafter. The previous calculation may be either one of addition, subtraction, multiplication, and division between the first and the second binary signals X and Y. By way of example, description will be directed to the addition between the first and the second binary signals X and Y. In addition, it will be assumed that the pre-processing circuit renders the first and the second binary signals X and Y into first and second modulo-3 estimation values A and B, respectively.

The illustrated error detecting circuit 20 comprises a modulo-3 code production circuit 41, a modulo-3 calculation circuit 42, a modulo-3 coincidence circuit 43, and a modulo-3 register 44. It is to be noted that the modulo-3 error detection according to this invention is applicable to the modulo-3 calculation circuit 42, the modulo-3 coincidence circuit 43, and the modulo-3 register 44 which may be called error detection elements.

At first, the binary result signal Z is supplied to the modulo-3 code production circuit 41. The modulo-3 code production circuit 41 converts the binary result signal Z into a modulo-3 code Z(3) by dividing the binary result signal Z by a modulus number 3. Therefore, the modulo-3 code Z(3) is representative of a modulo-3 residue and can be expressed by a code of two bits (z1, z2). In this connection, the modulo-3 code Z(3) may be generally represented by (z1, z2). The illustrated modulo-3 code production circuit 41 produces the modulo-3 code of (0, 0) on appearance of the residue of (1, 1). At any rate, the modulo-3 code production circuit 41 produces the modulo-3 codes of (0, 0), (0, 1), and (1, 0). Next, let the modulo-3 error detection according to this invention be applied to the modulo-3 calculation circuit 42 which is assumed to be either one of the modulo-3 adder, the modulo-3 multiplier, and the modulo-3 substractee that may be collectively called a calculation element. In the calculation element, first and second input modulo-3 codes will be represented by (a0, a1) and (b0, b1) while an output modulo-3 code will be represented by (c0, c1), where suffixes 0 and 1 are indicative of higher and lower significant bits, respectively.

Figure 3:
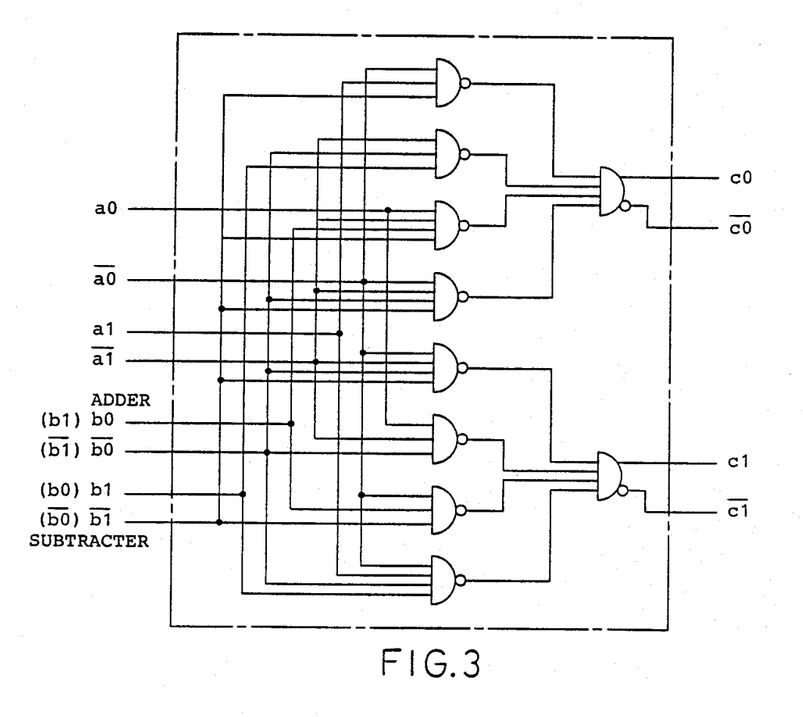
FIG. 3 is a circuit diagram for exemplifying a modulo-3 adder or a modulo-3 subtracter which can be used in the error detecting circuit illustrated in FIG. 2.

Referring to FIG. 3 in addition to FIG. 2, the modulo-3 adder according to the modulo-3 error detection of this invention will be described as an example of the calculation element. The modulo-3 adder is given the first and the second input modulo-3 codes (a0, a1) and (b0, b1) to produce the output modulo-3 code (c0, c1) in accordance with a truth table shown in Table 1. In FIG. 3, consideration is made about complements of the respective bits. In the illustrated example, the modulo-3 adder is supplied with the second input modulo-3 code represented by the second input code (b0, $\overline{b0}$, b1, $\overline{b1}$) which is not enclosed in FIG. 3 by parentheses.

TABLE 1

| INPUT | | | | OUTPUT | |
|---|---|---|---|---|---|
| a0 | a1 | b0 | b1 | c0 | c1 |
| 0 | 0 | 0 | 0 | 0 | 0 |
| 0 | 0 | 0 | 1 | 0 | 1 |
| 0 | 0 | 1 | 0 | 1 | 0 |
| 0 | 1 | 0 | 0 | 0 | 1 |
| 0 | 1 | 0 | 1 | 1 | 0 |
| 0 | 1 | 1 | 0 | 0 | 0 |
| 1 | 0 | 0 | 0 | 1 | 0 |
| 1 | 0 | 0 | 1 | 0 | 0 |
| 1 | 0 | 1 | 0 | 0 | 1 |
| 1 | 1 | — | — | 1 | 1 |
| — | — | 1 | 1 | 1 | 1 |

The illustrated modulo-3 adder comprises a preceding logic stage of eight NAND gates and a following logic stage of two NAND gates. The preceding logic stage is operable to monitor the modulo-3 code of (1, 1) in addition to the other modulo-3 codes of (0, 0), (0, 1), and (1, 0) while the following logic stage is operable to detect or produce the modulo-3 code of (1, 1) in addition to the other modulo-3 codes. The modulo-3 code of (1, 1) may be called a specific code. The preceding and the following logic stages may be referred to as a monitoring circuit and a detecting circuit, respectively.

It is readily possible for those skilled in the art to realize the circuit illustrated in FIG. 3. Therefore, description will be omitted about the structure of the circuit.

As shown in Table 1 and FIG. 3, the modulo-3 adder carries out addition modulo-3 in a usual manner. Moreover, the illustrated modulo-3 adder produces the output modulo-3 code (c0, c1) of (1, 1) as the specific code when either one of the first and the second input modulo-3 codes (a0, a1) and (b0, b1) takes the code of (1, 1) which never appears in a normal state. In other words, the output modulo-3 code (c0, c1) of (1, 1) shows the occurrence of an error in either one of the first and the second input modulo-3 codes (a0, a1) and (b0, b1). In addition, the output modulo-3 code (c0, c1) also takes (1, 1) on occurrence of an error in the modulo-3 adder. This shows that an error in the first and the second input modulo-3 codes can be checked or detected by monitoring the output modulo-3 code. Anyway, the modulo-3 code of (1, 1) is used in the illustrated modulo-3 adder as a defined code specifying an error. It is needless to say that any other logic circuits may be formed with reference to Table 1.

Further referring to FIG. 3, the modulo-3 subtracter of this invention is similar to the modulo-3 adder except that the modulo-3 subtracter is supplied with the second input modulo-3 code in the form b0, $\overline{b0}$, b1, and $\overline{b1}$ enclosed by parentheses. It is seen that the illustrated modulo-3 subtracter can be designed or formed in accordance with a truth table shown in Table 3. 2.

TABLE 2

| INPUT | | | | OUTPUT | |
|---|---|---|---|---|---|
| a0 | a1 | b0 | b1 | c0 | c1 |
| 0 | 0 | 0 | 0 | 0 | 0 |
| 0 | 0 | 0 | 1 | 1 | 0 |
| 0 | 0 | 1 | 0 | 0 | 1 |
| 0 | 1 | 0 | 0 | 0 | 1 |
| 0 | 1 | 0 | 1 | 0 | 0 |
| 0 | 1 | 1 | 0 | 1 | 0 |
| 1 | 0 | 0 | 0 | 1 | 0 |
| 1 | 0 | 0 | 1 | 0 | 1 |
| 1 | 0 | 1 | 0 | 0 | 0 |
| 1 | 1 | — | — | 1 | 1 |

TABLE 2-continued

| INPUT | | | | OUTPUT | |
|---|---|---|---|---|---|
| a0 | a1 | b0 | b1 | c0 | c1 |
| — | — | 1 | 1 | 1 | 1 |

The modulo-3 subtracter illustrated in FIG. 3 and Table 2 is similar to a usual modulo-3 subtracter except that the modulo-3 code (c0, c1) of (1, 1) is used to indicate an error like the modulo-3 adder. At any rate, the modulo-3 code of (1, 1) appears on the occurrence of at least one of the first and the second input modulo-3 codes (a0, a1) and (b0, b1) on the occurrence of an error in the modulo-3 subtracter.

Figure 4:
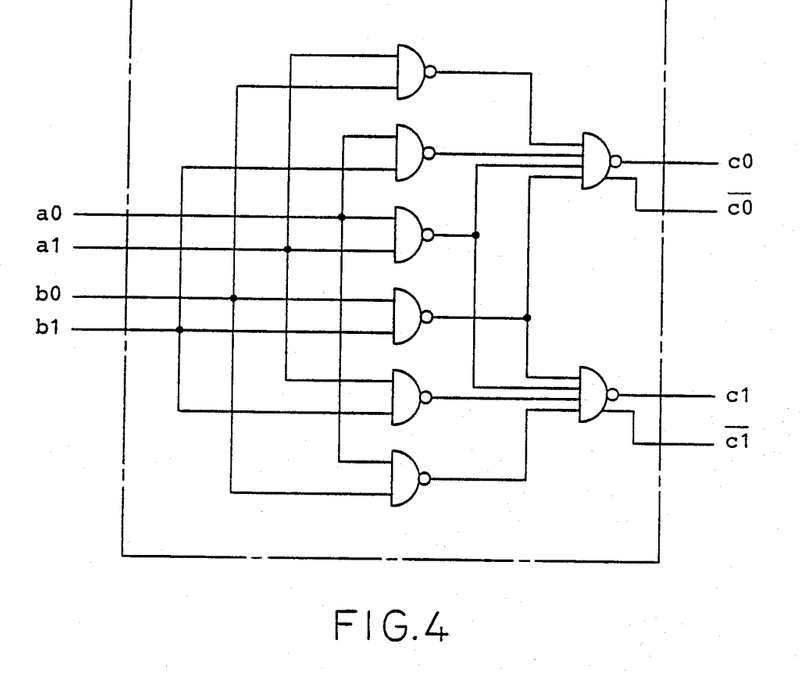
FIG. 4 is a circuit diagram for exemplifying a modulo-3 multiplier which can be used in the error detecting circuit illustrated in FIG. 2.

Referring to FIG. 4, the modulo-3 multiplier is designed with reference to a truth table shown in Table

TABLE 3

| INPUT | | | | OUTPUT | |
|---|---|---|---|---|---|
| a0 | a2 | b0 | b1 | c0 | c1 |
| 0 | 0 | 0 | 0 | 0 | 0 |
| 0 | 0 | 0 | 1 | 0 | 0 |
| 0 | 0 | 1 | 0 | 0 | 0 |
| 0 | 1 | 0 | 0 | 0 | 0 |
| 0 | 1 | 0 | 1 | 0 | 1 |
| 0 | 1 | 1 | 0 | 1 | 0 |
| 1 | 0 | 0 | 0 | 0 | 0 |
| 1 | 0 | 1 | 0 | 1 | 0 |
| 1 | 0 | 1 | 0 | 0 | 1 |
| 1 | 1 | — | — | 1 | 1 |
| — | — | 1 | 1 | 1 | 1 |

As shown in FIG. 4, the modulo-3 multiplier comprises a preceding logic stage of six gates and a following logic stage of two gates. The preceding and the following logic stages serve to monitor and produce the specific code of (1, 1) in addition to the other modulo-3 codes.

Any other structure and operation of FIG. 4 will not be described because they are readily understood from Table 3. At any rate, the illustrated modulo-3 multiplier produces the modulo-3 code (c0, c1) of (1, 1) when either one of the first and the second input modulo-3 codes takes the modulo-3 code of (1, 1) and when an error takes place in he modulo-3 multiplier.

It is possible for those skilled in the art to design a different modulo-3 multiplier with reference to table 3.

Figure 5:
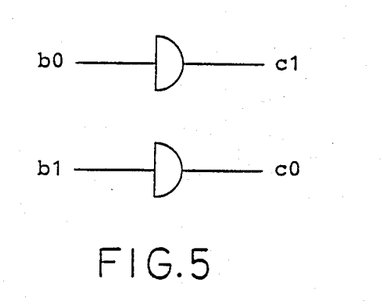
FIG. 5 is a circuit diagram for exemplifying a modulo-3 inverter applicable to the error detecting circuit illustrated in FIG. 2.

Referring to FIG. 5, the modulo-3 inverter can be readily formed with reference to Table 4. Operation and structure are obvious from FIG. 5 and Table 4 and will not therefore be described any longer.

TABLE 4

| INPUT | | OUTPUT | |
|---|---|---|---|
| b0 | b0 | c0 | c1 |
| 0 | 0 | 0 | 0 |
| 0 | 1 | 1 | 0 |
| 1 | 0 | 0 | 1 |
| 1 | 1 | 1 | 1 |

In this structure also, the output modulo-3 code (c0, c1) takes the specific code of (1, 1) in response to the input modulo-3 code (b0, b1) of (1, 1).

Referring to FIG. 6 afresh and FIG. 2 again, the modulo-3 coincidence circuit 43 can be implemented by a logic circuit which is illustrated in FIG. 6 and which is structured in accordance with a truth table shown in Table 5.

TABLE 5

| INPUT | | | | OUTPUT | |
|---|---|---|---|---|---|
| a0 | a1 | b0 | b1 | c0 | c1 |
| 0 | 0 | 0 | 0 | 0 | 0 |
| 0 | 1 | 0 | 1 | 0 | 1 |
| 1 | 0 | 1 | 0 | 1 | 0 |
| THE OTHER CASES | | | | 1 | 1 |

The illustrated logic circuit is organized in consideration of the bits (a0, a1, b0, b1) and the complements of the respective bits and comprises a preceding logic stage of three gates and a following logic stage of two gates, which are operable to monitor and produce the specific code of (1, 1), respectively.

From FIG. 6 and Table 5, it is seen that the modulo-3 coincidence circuit 43 detects coincidence between first and second input modulo-3 codes (a0, a1) and (b0, b1) to produce an output modulo-3 code (c0, c1) representative of a result of detection. Specifically, when the higher and the lower bits of the first modulo-3 code are coincident with the higher and the lower bits of the second modulo-3 code, respectively, the first input modulo-3 code is produced as the output modulo-3 code, as shown in Table 5. Otherwise, the modulo-3 code of (1, 1), namely, the specific code is produced as the output modulo-3 code from the modulo-3 coincidence circuit 43. Thus, such a specific code of (1, 1) serves as an error signal indicative of occurrence of an error in the modulo-3 coincidence circuit or incoincidence between the first and the second input modulo-3 codes (a0, a1) and (b0, b1). In other words, the specific code (c0, c1) of (1, 1) is produced upon the incoincidence between the first and the second input modulo-3 codes, on the occurrence of the modulo-3 code of (1, 1) in at least one of the input modulo-3 codes, and on the occurrence of the error in the modulo-3 coincidence circuit.

Referring to FIG. 7 together with FIG. 2, the modulo-3 code register 44 is supplied with an input signal D of a modulo-3 code (d0, d1) to produce an output signal E of a modulo-3 code (e0, e1) before reception of a strobe signal STB, as shown on the lefthand side of Table 6.

TABLE 6

| STATE BEFORE STROBE SIGNAL (STB) | | | | OUTPUT AFTER STB SIGNAL | |
|---|---|---|---|---|---|
| INPUT D | | OUTPUT E | | OUTPUT E | |
| d0 | d1 | e0 | e1 | e0 | e1 |
| 0 | 0 | 0 | 0 | 0 | 0 |
| 0 | 0 | 0 | 1 | 0 | 0 |
| 0 | 0 | 1 | 0 | 0 | 0 |
| 0 | 1 | 0 | 0 | 0 | 1 |
| 0 | 1 | 0 | 1 | 0 | 1 |
| 0 | 1 | 1 | 0 | 0 | 1 |
| 1 | 0 | 0 | 0 | 1 | 0 |
| 1 | 0 | 0 | 1 | 1 | 0 |
| 1 | 0 | 1 | 0 | 1 | 0 |
| 1 | 1 | — | — | 1 | 1 |
| — | — | 1 | 1 | 1 | 1 |

In FIG. 7, the modulo-3 register comprises a preceding logic stage of nine and a following logic stage of seven gates. It may be said that the nine gates of the preceding logic stage are for monitoring the specific code of (1, 1) in timed relation to the strobe signal while the seven gates of the following logic stage are for producing the specific code of (1, 1).

Under the circumstances, the modulo-3 code (e0, e1) of the output signal E is changed to a modulo-3 code (e0, e1) arranged on the righthand side of Table 6. As shown in Table 6, the modulo-3 register 44 produces the modulo-3 code (e0, e1) of (1, 1) after reception of the strobe signal STB when either the input signal or the output signal takes the modulo-3 code of (1, 1) before reception of the strobe signal STB. The other relationships between the input and the output signals D and E are similar to those of a conventional register. In this connection, the following logic stage illustrated in FIG. 7 comprises an additional gate 51 in addition to the conventional register. It is possible to modify the modulo-3 register into a register which serves to form a scan path.

Further referring to FIG. 7, a single bit signal f of the additional gate 51 may be produced in accordance with Table 7.

TABLE 7

| STATE BEFORE STROBE SIGNAL (STB) | | | | OUTPUT AFTER STB SIGNAL | | |
|---|---|---|---|---|---|---|
| INPUT D | | OUTPUT E | | E | | |
| d1 | d2 | e1 | e2 | e1 | e2 | f |
| 0 | 0 | 0 | 0 | 0 | 0 | 0 |
| 0 | 0 | 0 | 1 | 0 | 0 | 0 |
| 0 | 0 | 1 | 0 | 0 | 0 | 0 |
| 0 | 1 | 0 | 0 | 0 | 1 | 0 |
| 0 | 1 | 0 | 1 | 0 | 1 | 0 |
| 0 | 1 | 1 | 0 | 0 | 1 | 0 |
| 1 | 0 | 0 | 0 | 1 | 0 | 0 |
| 1 | 0 | 0 | 1 | 1 | 0 | 0 |
| 1 | 0 | 1 | 0 | 1 | 0 | 0 |
| 1 | 1 | — | — | 1 | 1 | 1 |
| — | — | 1 | 1 | 1 | 1 | 1 |

The single bit signal f takes the logic "1" level in response to the modulo-3 code (1, 1) of the output signal E, as seen from FIG. 7 and Table 6. Thus, it is possible to indicate occurrence of an error by the single bit signal f in the illustrated modulo-3 register.

The modulo-3 register 44 illustrated in FIG. 2 may be specified either by Table 6 of by Table 7.

Referring to FIG. 8, an error detection circuit 20a according to a first embodiment of this invention is included in a logic section 21a together with an arithmetic section 22 which comprises an arithmetic logic unit 31 and a result register 32 like in FIG. 1. The illustrated logic section 21a is supplied from a pre-processing circuit (not shown) with first and second binary signals X and Y. The first and the second binary signals X and Y are stored in first and second operand registers 26 and 27 like in FIG. 1, respectively.

Now, the illustrated logic section 21a produces a binary result signal Z representative of a result of calculation between the first and the second binary signals X and Y in a binary fashion and a modulo-3 value C of the result Z. The binary result signal Z is produced through the arithmetic logic unit 31 and the result register 32 in a manner similar to that illustrated in conjunction with FIG. 1. In order to produce the modulo-3 value C, the error detecting circuit 21a comprises a combination of the error detection elements mentioned in conjunction with FIG. 2.

More particularly, the error detecting circuit 20a comprises first and second input code modulo-3 production circuits 61 and 62 which are supplied as first and second binary input signals IN1 and IN2 with the first and second binary signals X and Y through the first and the second operand registers 26 and 27, respectively. The first and the second input code modulo-3 production circuits 61 and 62 are similar to that illustrated in conjunction with FIG. 2 and calculate residues of the first and the second binary signals X and Y with respect to the modulus number 3 to produce modulo-3 codes of two bits as first and second modulo-3 residue codes R1 and R2, respectively. It is to be noted here that the modulo-3 code of (0, 0) is produced from each production circuit 61 and 62 when the residues are equal to three and no detection of an error is carried out in the circuits 61 and 62.

The first and the second modulo-3 residue codes are sent to first and second modulo-3 coincidence circuits 63 and 64 which are similar to that illustrated in conjunction with FIGS. 2 and 6 and Table 5. The first modulo-3 coincidence circuit 63 is supplied with the first modulo-3 residue code R1 and the first modulo-3 estimation value A while the second modulo-3 coincidence circuit 64 is supplied with the second modulo-3 residue code R2 and the second modulo-3 estimation value B. Each of the first and the second modulo-3 coincidence circuits 63 and 64 checks in the above-mentioned manner whether or not coincidence occurs between each residue code and each estimation value. As a result, first and second detection results D1 and D2 are produced from the first and the second modulo-3 coincidence circuits 63 and 64 in accordance with Table 5. The first and the second detection results D1 and D2 take the modulo-3 codes on the occurrence of coincidence or a specific code of (1, 1) on the occurrence of the incoincidence and on reception of (1, 1), as shown in Table 5.

The first and the second detection results D1 and D2 stored in first and second modulo-3 registers 66 and 67 in response to a strobe signal STB (FIG. 7 and Table 6) and delivered to a modulo-3 calculation element 68 which may carry out a modulo-3 predetermined calculation, such as addition, subtraction, multiplication, and division. The modulo-3 predetermined calculation may be identical with calculation carried out in the arithmetic logic unit 31 in a binary fashion. Anyway, the modulo-3 calculation circuit 68 calculates a modulo-3 estimation value RC concerned with the binary result signal Z. The modulo-3 estimation value is produced in accordance with Tables 1 through 3 from the modulo-3 calculation element 68 and is sent to an output modulo-3 coincidence circuit 71 operable in a manner illustrated in Table 5.

On the other hand, the binary result signal Z is sent to a modulo-3 result production circuit 73 which is operable in a manner similar to the first and the second input code production circuits 61 and 62. As a result, the modulo-3 result production circuit 73 supplies the output modulo-3 coincidence circuit 71 with a modulo-3 result value RR. The output modulo-3 coincidence circuit 71 compares the modulo-3 result value RR with the modulo-3 estimation value RC in accordance with Table 5 to produce a result CP of comparison represented by either the modulo-3 codes or the specific code of (1, 1). The result CP of comparison is stored in timed relation to a strobe signal STB into a modulo-3 output register 75 operable in accordance with Table 6 and is sent to an external circuit (not shown) as the modulo-3 value C of the result Z.

In the above-mentioned structure, let an error or a fault appear in the first modulo-3 register 66 and the specific code of (1, 1) be produced in an input signal of the first modulo-3 register 66. The specific code of (1, 1) is sent through the modulo-3 calculation circuit 68 and the output modulo-3 coincidence circuit 71 to the modulo-3 output register 75. Accordingly, the specific code of (1, 1) is produced from the modulo-3 output register 75 as an error signal representative of occurrence of the error.

Likewise, let incoincidence be detected in the second modulo-3 coincidence circuit 64. In this event, the second modulo-3 coincidence circuit 64 produces the specific code of (1, 1) representative of occurrence of the incoincidence. The specific code of (1, 1) is sent from the second modulo-3 coincidence circuit 64 to the modulo-3 output register 75 through the second modulo-3 register 67 and the modulo-3-calculation element 68.

It is assumed that a fault takes place in the arithmetic logic unit 31 and puts the binary result signal Z in disorder. The modulo-3 result value RR is sent from the modulo-3 result production circuit 73 to the output modulo-3 coincidence circuit 71 and compared with the modulo-3 estimation value RC. In the above-mentioned state, the output modulo-3 coincidence circuit 71 produces the specific code of (1, 1) which is representative of the occurrence of the incoincidence or reception of (1, 1) and which is sent to the modulo-3 output register 75 as the modulo-3 value C.

Furthermore, let the first modulo-3 estimation value A be representative of the specific code of (1, 1). The specific code of (1, 1) is sent from the first modulo-3 coincidence circuit 63 to the modulo-3 output register 75 through the first modulo-3 coincidence circuit 63, the first modulo-3 register 66, the modulo-3 calculation element 68, and the output modulo-3 coincidence circuit 71.

The illustrated logic section 21a may be connected to the following logic section in cascade and is operable as a preceding section. In this structure, let the modulo-3 value C of the result Z be rendered into the specific code of (1, 1) due to the occurrence of an error in the preceding section. In this event, the occurrence of the error can be transmitted from the preceding section to the following one. Therefore, the following section can detect occurrence of an error by monitoring the modulo-3 value.

When the occurrence of an error is notified by the modulo-3 code of (1, 1), it is readily possible to locate the error by investigating a flow of the specific code of (1, 1). At any rate, a combination of the modulo-3 result production circuit 73, the output modulo-3 coincidence circuit 71, and the modulo-3 output register 75 is operable as an error detecting unit for detecting an error.

Referring to FIG. 9, an error detection circuit 20b according to a second embodiment of this invention is similar in structure and operation to that, illustrated in FIG. 8 except that each of the first and second modulo-3 registers 66a and 67a and a modulo-3 output register 75a is operable in accordance with Table 7 to produce a single bit signal f so as to indicate the occurrence of an error and that an OR gate 78 is operable in response to the single bit signals f sent from the first and the second modulo-3 registers 66a and 67a and the modulo-3 output register 75a.

As shown in Table 7, each single bit signal f takes the logic "1" level only when the specific code of (1, 1) appears as the output signal (e0, e1) after reception of the strobe signal STB. In other words, the specific code of (1, 1) is produced from each register 66a, 67a, and 75a when the specific code of (1, 1) is kept in the registers before reception of the strobe signal STB or when the specific code of (1, 1) is received in the registers before reception of the strobe signal STB. Such a specific code of (1, 1) is kept unchanged in each register.

Under the circumstances, it is readily understood that the OR gate 78 produces the logic "1" level when the specific code of (1, 1) appears in either one of the first and the second modulo-3 registers 66a and 67a and the modulo-3 output register 75a. Such a logic "1" level is supplied to the following section as an error detection signal E indicative of detection of an error.

Referring to FIG. 10, a logic section 21 comprises an error detection circuit 20c according to a third embodiment of this invention and an arithmetic section 22. The illustrated logic section 21 comprises similar parts designated by like reference numerals. Like in FIGS. 8 and 9, the illustrated error detection circuit 20c is supplied with the first and the second binary signals X and Y and the first and the second modulo-3 estimation values A and B calculated from the first and the second binary signals X and Y, respectively. In the example being illustrated, a binary result signal Z is divided into higher and lower significant parts Z1 and Z2 through the arithmetic section 22. The higher and the lower significant parts Z1 and Z2 may be dealt with as individual data signals in a following section. In addition, the illustrated error detection circuit 20c produces higher and lower modulo-3 estimation values C and D of the higher and the lower significant parts Z1 and Z2, respectively.

The error detection circuit 20c processes the first and the second binary signals X and Y and the first and the second modulo-3 estimation values A and B in a manner similar to that illustrated in FIG. 9. In this connection, the modulo-3 estimation value RC is produced from the modulo-3 calculation circuit 68 in the manner illustrated in FIG. 9 and will be called a total estimation code for convenience of description.

Now, the higher and the lower significant parts Z1 and Z2 are delivered to first and second partial modulo-3 production circuits 81 and 82 which are operable in a manner similar to that described in conjunction with the modulo-3 code production circuit 41 (FIG. 2). As a result, the first partial modulo-3 production circuit 81 produces a first partial modulo-3 code r(z1) corresponding to the higher significant part Z1 while the second partial modulo-3 production circuit 82 produces a second partial modulo-3 code r(z2) corresponding t the lower significant part Z2. The first and the second partial modulo-3 codes r(z1) and r(z2) are specified by residues resulting from division of the result Z by the modulus number 3.

In the illustrated example, the total estimation value RC is delivered to first and second modulo-3 subtracters 86 and 87 in common. Supplied with the second partial modulo-3 code r(z2), the first modulo-3 subtracter 86 subtracts the second partial modulo-3 code r(z2) from the total estimation code RC to produce a first modulo-3 difference Da between the total estimation code RC and the second partial modulo-3 code r(z2). The first modulo-3 difference Da takes the specific code of (1, 1) when at least one of the total estimation code RC and the second partial modulo-3 code r(z2) is equal to (1, 1). The specific code of (1, 1) is indicative of occurrence of an error, as already mentioned before. Otherwise, the first modulo-3 difference Da takes either one of the modulo-3 codes (0, 0) (0, 1), and (1, 0). The first modulo-3 difference Da has to be equal to the first partial modulo-3 code r(z1) of the higher significant part Z1 without any error.

Likewise, the second modulo-3 subtracter 87 subtracts the first partial modulo-3 code r(z1) from the total estimation code RC to produce a second modulo-3 difference Db between the total estimation code RC and the first partial modulo-3 code r(z1). The second modulo-3 difference Db takes either the specific code of (1, 1) or one of the modulo-3 codes like the first modulo-3 difference Da and has to be equal to the second partial modulo-3 code r(z2) of the lower significant part Z2 when no error takes place.

Under the circumstances, a first modulo-3 partial coincidence circuit 88 compares the first partial modulo-3 code r(z1) with the first modulo-3 difference Da so as to detect whether or not the first partial modulo-3 code r(z1) is coincident with the first modulo-3 difference Da. When coincidence is detected between them, the first partial modulo-3 code r(z1) is produced as a first partial modulo-3 result as it stands. Upon detection of incoincidence or on the detection of the specific code of (1, 1) in one of the first partial modulo-3 code r(z1) and the first modulo-3 difference Da, the specific code of (1, 1) is produced as the first partial modulo-3 result.

Similarly, a second modulo-3 partial coincidence circuit 89 produces, as a second partial modulo-3 result, the second partial modulo-3 code r(z2) on detection of coincidence between the second partial modulo-3 code r(z2) and the second modulo-3 difference Db. On the other hand, the specific code of (1, 1) is produced as the second partial modulo-3 result either on the detection of the incoincidence or on the detection of the specific code in one of the second partial modulo-3 code r(z1) and the second modulo-3 difference Db.

The first and the second partial modulo-3 results are stored in response to the strobe signal STB in first and second partial modulo-3 output registers 91 and 92 which are operable in accordance with Table 6, respectively. Thereafter, the first and the second partial modulo-3 results are produced as the higher and the lower modulo-3 estimation values C and D through the first and the second partial modulo-3 output registers 91 and 92, respectively.

The higher and the lower modulo-3 estimation values C nd D are processed in a next following illustrated, the logic section 21 can locally be module-3 circuit (not shown). In the example being investigated by the use of the higher and the lower modulo-3 estimation values C and D. Accordingly, it is readily possible to precisely locate an error in the illustrated logic section 21 by monitoring a plurality modulo-3 estimation values, such as C and D.

Referring to FIG. 11, description will be made about an error detection circuit according to a fourth embodiment of this invention. The error detection circuit 20d is for use in checking or detecting a binary result signal Z which results from first and second binary signals X and Y, as shown in FIG. 10. The binary result signal Z is assumed to consist of N bits which are divisible into higher and lower significant parts Z1 and Z2. Let the higher significant part Z1 consist of M bits, where M is smaller than N. Like in FIG. 10, the illustrated detection circuit 20d is supplied with first and second modulo-3 estimation values A and B which appear as residues obtained by dividing the first and the second binary signals X and Y by the modulus number 3.

Like in FIG. 10, the higher and the lower significant parts Z1 and Z2 are supplied to first and the second modulo-3 estimation values A and B are delivered to a modulo-3 calculation circuit 68 to calculate a modulo-3 estimation value RC.

In the illustrated example, the first partial modulo-3 production circuit 81 supplies a first partial modulo-3 code r(z1) to a modulo-3 coincidence circuit 95 which is operable in accordance with Table 5.

On the other hand, the second partial modulo-3 production circuit 82 supplies a second partial modulo-3 code r(z2) to a modulo-3 subtracter 96 which is supplied with the modulo-3 estimation value RC given as a result of calculation between the first and the second modulo-3 estimation values A and B. The modulo-3 subtracter 96 is operable in Table 2 and subtracts the second partial modulo-3 code r(z2) from the modulo-3 estimation value RC to produce a modulo-3 difference Df between the second partial modulo-3 code r(z2) and the modulo-3 estimation value RC. The modulo-3 difference Df has to be equal to the first partial modulo-3 code r(z1) as long as no error takes place. The modulo-3 difference Df is sent to the modulo-3 coincidence circuit 95.

Under the circumstances, the modulo-3 coincidence circuit 95 is operable in accordance with Table 5 and detects whether or not the first partial modulo-3 code r(z1) is coincident with the modulo-3 difference Df. On detection of coincidence between r(z1) and Df, the first partial modulo-3 code r(z1) is produced from the modulo-3 coincidence circuit 95 as a detection result signal DR. On the other hand, the specific code of (1, 1) is produced from the modulo-3 calculation circuit 95 either upon the detection of incoincidence between r(z1) and Df or on the detection of the specific code of (1, 1) in one of r(z1) and Df.

With this structure, let an error take place in the second partial modulo-3 production circuit 82 and the specific code of (1, 1) appear in the second partial modulo-3 code r(z2). In this event, the specific code of (1, 1) is sent through the modulo-3 subtracter 96 and the modulo-3 coincidence circuit 95 as the detection result signal DR. The detection result signal DR of (1, 1) is indicative of occurrence of an error.

Let the first modulo-3 estimation value A take the specific code of (1, 1). In this case, the specific code of (1, 1) is sent from the modulo-3 calculation circuit 68 to the modulo-3 coincidence circuit 95 through the modulo-3 subtracter 96. As a result, the specific code of (1, 1) is produced as the detection result signal DR to represent occurrence of an error.

Referring to FIG. 12, a logic section 21 comprises an error detection circuit 20d according to a fifth embodiment of this invention. The error detection circuit 20d comprises a part similar in structure and operation to that illustrated in FIG. 11 and an arithmetic section 22 comprising an arithmetic logic unit 31 and a result register 32. Elements and signals equivalent to those illustrated in the other figures are depicted at the same reference numerals and symbols.

The first and the second binary signals X and Y are kept in the first and the second operand registers 26 and 27 and sent to the arithmetic logic unit 31 to be subjected to a predetermined calculation. A result of calculation is stored in the result register 32 as a binary result signal Z. The illustrated binary result signal Z of calculation consists of N bits which are divisible into a higher significant part Z1 of M bits and a lower significant part Z2 of the remaining bits (N−M). For brevity of calculation, it may be assumed that the arithmetic logic unit 31 adds the first binary signal X to the second binary signal Y to make the result register 32 store a sum as the binary result signal Z. In the illustrated logic section 21', the higher significant part Z1 of the sum is produced as an output result signal.

The first and the second modulo-3 estimation values A and B are processed together with the first and the second binary signals X and Y in the manner mentioned in conjunction with FIG. 10 and are sent to the modulo-3 calculation circuit 68. The illustrated modulo-3 calculation circuit 68 carries out addition with respect to the modulus number 3 like the arithmetic logic unit 31 to produce the modulo-3 estimation code RC which is specified by a residue calculated by modulo-3 addition of the first and the second modulo-3 estimation values A and B.

The second partial modulo-3 code r(z2) is subtracted from the modulo-3 estimation code RC by the modulo-3 subtracter 96 to produce the modulo-3 difference Df which is to be equal to the first partial modulo-3 code r(z1). The modulo-3 coincidence circuit 95 detects either the coincidence or incoincidence between the modulo-3 difference Df and the second partial modulo-3 code r(z2) in the manner mentioned in conjunction with FIG. 11. The detection result DR is sent to the modulo-3 output register 75 and is stored therein in timed relation to the strobe signal STB (Table 6) to be produced as the modulo-3 value C.

In general, it is to be noted here that the modulo-3 value of Z is equal to the sum of the modulo-3 values of Z1 and Z2 and is also equal to the sum of the modulo-3 values of A and B, where no error is present. It is readily understood that the error detection circuit 20d illustrated in FIGS. 11 and 12 can detect an error by the use of the above-mentioned relationship. At any rate, the specific code of (1, 1) appears as the detection result DR and the modulo-3 code C on occurrence of the error.

Referring to FIG. 13, an error detection circuit 20e according to a sixth embodiment of this invention is included in a logic section 21 together with an arithmetic section 22. The illustrated error detection circuit 20e is similar to that illustrated in FIG. 12 except that each of first and second modulo-3 registers 66a and 67a and a modulo-3 output register 75a is operable in accordance with Table 7 like in FIG. 9 and that single bit signals f1, f2, and f3 are given from the first and the second modulo-3 registers 66a and 67a and the modulo-3 output register 75a to an OR gate 78, respectively. It is needless to say that the first and the second modulo-3 registers 66a and 67a produce modulo-3 codes in timed relation to the strobe signal STB and that the modulo-3 output register 75a produces the modulo-3 value C. Under the circumstances, each of the single bit signals f1, f2, and f3 takes the logic "1" level when the specific code of (1, 1) is given to each register 66a, 67a, and 75a on production of the strobe signal, as already described in conjunction with Table 7 and FIG. 9. The logic "1" level of each single bit signal f1, f2, and f3 is kept intact after reception of the strobe signal STB once each register is turned into (1, 1).

As a result, the logic "1" level of each single bit signal f1, f2, and f3 is produced through the OR gate 78 as an error detection signal E.

Referring to FIG. 14, a calculation system 21'' is for use in carrying out a predetermined calculation and comprises a plurality of calculation elements each of which is similar in structure to the logic section illustrated in FIGS. 8, 9, 10, 12, and 13. The illustrated system is supplied with first through sixth binary signals X, Y, Z, R, S, and T depicted at double lines, respectively, and with first through sixth modulo-3 codes x, y, z, r, s, and t calculated from the first through the sixth binary signals X, Y, Z, R, S, and T, respectively.

By way of example, the predetermined calculation is assumed to obtain first and second binary results H and Q given by:

$H = -(X+Y+Z-R),$ and $Q = (X+Y-S\times T) \boxtimes (X+Y+Z-R).$

In addition, similar calculation is carried out with respect to the modulus number 3 to obtain first and second modulo-3 results h and q which correspond to the first and the second binary results H and Q and which are given by:

$h = -(x \boxplus y \boxplus z \boxminus r),$ and $q = (x \boxplus y \boxminus s \boxtimes t) \boxtimes (x \boxplus y \boxplus z \boxminus r).$ To this end, the illustrated system 21 comprises, as the calculation elements, first and second adders 101 and 102, first and second subtracters 103 and 104, first and second multipliers 106 and 107, and an inverter 108.

Responsive to the first and the second binary signals X and Y, the first adder 101 supplies a binary sum (X+Y) of the first and second binary signals X and Y to the second adder 102 and the second subtracter 104 through a data path 111. The first adder 101 is supplied with the first and the second modulo-3 codes x and y and carries out addition between the first and the second modulo-3 codes with respect to the modulus number 3 to produce a modulo-3 estimation value (x $\boxplus$ y) of the sum (X+Y). The modulo-3 estimation value (x $\boxplus$ y) is delivered through a data path 112 to the second adder 102 and to the second subtracter 104 like the sum (X+Y). Upon detection of an error, the first adder 101 produces the specific code of (1, 1) as the modulo-3 estimation value. Otherwise, either one of the remaining modulo-3 codes is produced as the modulo-3 estimation value. Supplied with the third and the fourth binary signals Z and R, the first subtracter 103 subtracts the fourth binary signal R from the third binary signal Z to calculated a binary difference Z−R. The binary difference Z−R is delivered through a data path 113 to the second adder 102.

The first subtracter 103 is also supplied with the third and the fourth modulo-3 codes z and r to produce a modulo-3 difference (z $\boxminus$ r) corresponding to the binary difference Z−R. The modulo-3 difference (z $\boxminus$ r) serves to check whether or not the binary difference Z−R is correct. At any rate, the modulo-3 difference exhibits the specific code of (1, 1) on detection of an error and is sent through a data path 114 to the second adder 102.

Responsive to the fifth and the sixth binary signals S and T, the first multiplier 106 multiplies the fifth binary signal S by the sixth binary signal T to produce a product S×T of the fifth and the sixth binary signals S and T. A modulo-3 product s $\boxtimes$ t is also calculated in the first multiplier 106 in accordance with Table 3 to check the product S×T in the manner mentioned before. The modulo-3 product s ⊠ t takes the specific code of (1, 1) on detection of an error. Otherwise, the modulo-3 product takes either one of the modulo-3 codes (0, 0), (0, 1), and (1, 0).

The product S×T and the modulo-3 product s ⊠ t are supplied from the first multiplier 106 through data paths 115 and 116 to the second subtracter 104 which is given the binary sum (X+Y) and the modulo-3 estimation value (x ⊞ y).

Supplied with the binary (X+Y), its modulo-3 estimation value (x ⊞ y), the binary difference (Z−R), and its modulo-3 difference (z ⊟ r), the second adder 102 produces an additional binary sum represented by (X+Y+Z−R), and an additional modulo-3 sum represented by (x ⊞ y ⊞ z ⊟ r). The additional modulo-3 sum is a modulo-3 estimation value of the additional binary sum (X+Y+Z−R) and is produced in accordance with Table 1. On detection an error, the additional modulo-3 sum takes the specific code of (1, 1), like in the first adder 101, the first subtracter 103, and the first multiplier 106.

At any rate, the additional binary sum and the additional modulo-3 sum are delivered through data paths 117 and 118 to both the inverter 108 and the second multiplier 107.

Responsive to the binary sum (X+Y), the modulo-3 estimation value (x ⊞ y), the product (S×T), and the modulo-3 product s ⊠ t, the second subtracter 104 calculates an additional binary difference represented by (X+Y−S×T) and an additional modulo-3 difference (x ⊞ y ⊟ s ⊠ t). The additional binary difference (X+Y−S×T) is checked by the additional modulo-3 difference (x ⊞ y ⊟ s ⊠ t) in the above-mentioned manner. The additional modulo-3 difference takes the specific code of (1, 1) on detection of an error.

The additional binary difference and the additional modulo-3 difference are sent through data paths 121 and 122 to the second multiplier 107 which is supplied with the additional binary sum and the additional modulo-3 sum.

Supplied with the additional binary sum and the additional modulo-3 sum, the inverter 108 logically inverts the additional binary sum and the additional modulo-3 sum into −(S+Y+Z−R) and ⊟(x ⊞ y ⊞ z ⊟ r), respectively. The inverted results are produced through data paths 123 and 124 as the first binary result H and the first modulo-3 result h, respectively. On detection of an error, the specific code of (1, 1) is produced as the first modulo-3 result h.

Responsive to the additional binary sum, the additional modulo-3 sum, the additional binary difference, and the additional modulo-3 difference, the second multiplier 107 produces through data paths 126 and 127 the second binary result Q and the second modulo-3 result q given by (X+Y+Z−R)×(X+Y−S×T) and (x ⊞ y ⊞ z ⊟ r) ⊠ (x ⊞ y ⊟ s ⊠ t), respectively. On detection of an error, the specific code of (1, 1) appears as the second modulo-3 result q like in any other calculation elements.

For example, let an error take place in the first multiplier 106 and the specific code of (1, 1) appear on the data path 116. In this case, the specific code of (1, 1) is sent through the second subtracter 103, and the second adder 107 and appears as the second modulo-3 result q. It is therefore possible to locate the error in the first multiplier 106 by following a path or flow of the specific code of (1, 1).

Alternatively, let the fourth modulo-3 code r take the specific pattern of (1, 1). In this event, the specific code of (1, 1) is sent through the first subtracter 103, the second adder 102, and the inverter 108 to the data path 124 as the first modulo-3 result h on the one hand. On the other hand, the specific code of (1, 1) is sent through the first subtracter, the second adder 102, and the second adder 107 to the data path 127 as the second modulo-3 result q. Thus, the specific code of (1, 1) appears as each of the first and the second modulo-3 results h and q. This shows that an error occurs somewhere in paths of producing both he first and the second modulo-3 results h and q. By following the specific code of (1, 1), it is possible to detect that the errors in the first and the second modulo-3 results h and q result from a common cause. As a result, it can be detected that the errors are ascribed to a fault of a stage preceding the illustrated system 21″.

In a conventional manner, no consideration is made about the specific code of (1, 1). This implies that a wide variety of the modulo-3 codes appear as the first and the second modulo-3 results h and q, depending on structure of each calculation element, when an error occurs in a conventional system. Accordingly, it is difficult to detect occurrence of an error. Depending on a logical structure of the conventional system, an error might occur which can not be detected. When the conventional system comprises a plurality of stages, it is difficult to locate an error appearing in each stage. Therefore, error location in the conventional system is low in resolution of locating an error.

In the above-mentioned embodiments, it is possible to detect and locate an error or an incorrect data signal by monitoring the specific code of (1, 1). Therefore, error detection and location can be carried out with a high detection rate and with a high resolution of locating an error. Thus, the specific code of (1, 1) is used as a logically significant code in the system according to this invention. On designing a large scale integrated circuit, it is therefore unnecessary to describe a logically meaningless code which is available only for error detection.

It is therefore possible to improve efficiency of designing the large scale integrated circuit.

While this invention has thus far been described in conjunction with several embodiments thereof, it will be readily be possible for those skilled in the art to put this invention units practice in various other manners. For example, a modulus number m may be generally equal to $2^k-1$ where k is an integer greater than unity, although the above-mentioned description is made only about the modulus number 3. In this event, the specific code is represented by k bits and may be given by an extraordinary pattern unused in logical calculation. All of the k bits of the extraordinary pattern preferably take the logic "1" levels. In each of the modulo-3 coincidence circuits, such as 63, 64, coincidence may be detected among a first through n-th input signals where n is an integer greater in number to two.

What is claimed is:

1. An error detection method of detecting an error in response to a binary signal of k bits which is recognized as a number of an m-ary system, where k is a positive integer greater than unity and m is equal to $(2^k-1)$, said binary signal of k bits being made to correspond to zeroth through (m−1)-th codes as defined codes in said m-ary system, wherein the method comprises the steps of:

monitoring an m-th code which appears as an undefined code in said m-ary system; and detecting said undefined code in said binary signal in order to determine an occurrence of said undefined code as an occurrence of said error.

2. An error detection method as claimed in claim 1, each of the k bits taking either a logic "1" level or a logic "0" level, wherein said m-th code is represented by a predetermined pattern.

3. An error detection method as claimed in claim 2, wherein said predetermined pattern takes the logic "1" level at every one of the k bits.

4. An error detection method as claimed in claim 3, wherein said preselected one of the four sets is given by (1, 1).

5. An error detection method as claimed in claim 2, said k being equal to two while said m is equal to three, said k bits taking either one of four sets of two bit patterns (0, 0), (0, 1), (1, 0), and (1, 1) and being divisible into said predetermined code and three normal codes except said predetermined code, wherein said predetermined code is defined by a preselected one of said four sets while said normal codes are defined by the remaining ones of said four sets.

6. An error detection circuit for use in detecting an error in a binary signal of k bits which is recognized as a number of an m-ary system, where k is a positive integer greater than unit and m is equal to ($2^k-1$), said binary signal of k bits being made to correspond to zeroth through (m−1)-th codes as defined codes in said m-ary system, wherein the circuit comprises:

monitoring means responsive to said binary signal for monitoring an m-th code which appears as an undefined code in said m-ary system; and detecting means coupled to said monitoring means for detecting said undefined code in said binary signal as an occurrence of said error in order to produce an error detection signal representative of detection of said error.

7. An error detection circuit as claimed in claim 6, each of the k bits taking either a logic "1" level or a logic "0" level, wherein said m-th code is represented by a predetermined pattern.

8. An error detection circuit as claimed in claim 7, wherein said predetermined pattern takes the logic "1" level at every one of the k bits.

9. An error detection circuit as claimed in claim 7, said k being equal to two while said m is equal to three, said k bits taking either one of four sets of two bit patterns (0, 0), (0, 1), (1, 0), and (1, 1) and being divisible into said predetermined code and three normal codes except said predetermined code, wherein said predetermined code is defined by a preselected one of said four sets while said normal codes are defined by the remaining ones of said four sets.

10. An error detection circuit as claimed in claim 9, wherein said preselected one of the four sets is given by (1, 1).

11. An error detection circuit for use in detecting an error in response to an input signal including first through n-th binary signals each of which has k bits and which is recognized as a number of an m-ary system, where k and n are positive integers greater than unity, respectively, and m is equal to ($2^k-1$), said first through n-th binary signals being coincident with one another when no error takes place in said first through n-th binary signals, said binary signal of k bits being made to correspond to zeroth through (m−1)-th codes as defined codes in said m-ary system, wherein the circuit comprises:

monitoring means responsive to said first through n-th binary signals for monitoring in each of said first through n-th binary signals an m-th code which appears as an undefined code in said m-ary system; and detecting means coupled to said monitoring means for detecting said undefined code in said binary signals in order to determine an occurrence of said undefined code as an occurrence of said error.

12. An error detection circuit as claimed in claim 11, each of the k bits taking either a logic "1" level or a logic "0" level, wherein said m-th code is represented by a predetermined pattern.

13. An error detection circuit, as claimed in claim 12, wherein said predetermined pattern has the logic "1" level at every one of the k bits.

14. An error detection circuit as claimed in claim 13, said k and m being equal to two and three, respectively, wherein said m-th code is represented by said predetermined pattern of (1, 1).

15. An error detection circuit as claimed in claim 12, wherein said detecting means comprises:

coincidence detecting means for detecting whether or not said first through n-th binary signals are coincident with one another to allow a selected one of said first through n-th binary signals to pass therethrough on detection of coincidence of said first through n-th binary signals, and, otherwise, to produce said m-th code.

16. An error detection circuit as claimed in claim 15, further comprising:

calculation means for carrying out a predetermined calculation among said first through n-th binary signals modulo m to produce a result of calculation;

said detecting means comprising:

code detecting means coupled to said monitoring means for detecting said m-th code in each of said first through n-th binary signals; and means coupled to said code detecting means and said calculation means for producing said m-th code as said error signal when said m-th code appears in at least one of said first through n-th binary signals and, otherwise, for producing said result of calculation.

17. In a logic circuit comprising a circuit element which is for use in carrying out a predetermined operation in response to an input signal of k bits to produce an output signal of k bits, each of said input signal and said output signal being recognized as a number of an m-ary system, where k is an integer greater than unity and m is equal to ($2^k-1$), said input and output signals of k bits being made to correspond to zeroth through (m−1)-th codes as defined codes in said m-ary system, the wherein said circuit element comprises:

monitoring means responsive to said input signal for monitoring an m-th code which appears as an undefined code in said m-ary system with said predetermined operation carried out in said monitoring means; and producing means coupled to said monitoring means for producing said m-th code on occurrence of said m-th code as said output signal.

18. A logic circuit as claimed in claim 17, wherein said circuit element is a register circuit for storing said input signal produce a stored signal as said output signal.

19. A logic circuit as claimed in claim 18, wherein said producing means of the register circuit comprises:
- a gate for producing a single bit signal only on occurrence of said m-th code; and
- means for producing said stored signal as said output signal including said m-th code.

20. In a logic circuit comprising a circuit element which is for use in carrying out a preselected operation in response to first through n-th input signals to produce an output signal, each of said first through n-th input signals and said output signal having k bits and being recognized as a number of an m-ary system, where k and n are integers greater than unity and m is equal to $(2^k-1)$, said input and output signals of k bits being made to correspond to zeroth through $(m-1)$-th codes as defined codes in said m-ary system wherein said circuit element comprises:
- monitoring means responsive to said first through said n-th input signals for monitoring an m-th code which appears as an undefined code in said m-ary system with said preselected operation carried out in said monitoring means; and
- producing means coupled to said monitoring means for producing said m-th code on occurrence of said m-th code as said output signal and, otherwise, either one of said zeroth through $(m-1)$-th codes.

21. A logic circuit as claimed in claim 20, wherein said preselected operation is a selected one of addition, subtraction, and multiplication among said first through n-th input signals.

22. A logic circuit as claimed in claim 21, further comprising:
- storing means coupled to said circuit element for storing said zeroth through m-th codes.

23. A logic circuit as claimed in claim 22, further comprising:
- an additional element for producing an additional output signal of k bits which is expressed corresponding to said defined codes and which has to be equal to said output signal when no error is present;
- coincidence detecting means coupled to said circuit element and said additional element for detecting whether or not said additional output signal is coincident with said output signal to produce a selected one of said additional output signal and said output signal on detection of said coincidence and to produce said m-th code on detection of incoincidence between said additional output signal and said output signal and on detection of the m-th code in at least one of said additional output signal and said output signal, said selected one of the additional output signal and the output signal and said m-th code being produced as a detection result signal.

24. A logic circuit as claimed in claim 23, further comprising:
- storing means coupled to said coincidence detecting means for storing said detection result signal which takes either one of the zeroth through m-th codes.

25. A logic circuit as claimed in claim 20, wherein said preselected operation is for detecting coincidence among said first through n-th input signals.

26. A logic circuit as claimed in claim 25, further comprising:
- storing means coupled to said circuit element for storing said output signal which takes either one of the zeroth through m-th codes.

27. A logic circuit for use in carrying out preselected calculation in response to first through n-th binary input signals to produce a binary output signal representative of a result of said preselected calculation, said logic circuit being supplied with first through n-th modulo-m input signals calculated from the respective first through n-th binary input signals with respect to a modulus number m, each of said first through n-th binary input signals and said binary output signal having k bits and being specified by zeroth through $(m-1)$-th codes when said k bits are represented with respect to a modulus number m, where k and r are positive integers and m is equal to two to the k-th power minus one $(2^k-1)$, said logic circuit comprising:
- modulo-m code production means responsive to said first through n-th binary input signals for producing first through n-th modulo-m estimation codes obtained from said first through n-th binary input signals, respectively;
- coincidence detecting means coupled to said modulo-m code production means and responsive to said first through n-th modulo-m input signals for detecting either coincidence or incoincidence between said first through n-th modulo-m estimation codes and said first through n-th modulo-m input signals to produce first through n-th results of comparison, each of said first through n-th results of comparison taking one of zeroth through $(m-1)$-th codes on detection of said coincidence while each of said first through n-th results of comparison takes said m-th code on detection of said incoincidence and on appearance of said m-th code in said first through n-th modulo-m input signals and in said first through n-th modulo-m estimation codes;
- calculating means coupled to said coincidence detecting means for carrying out said preselected calculation among said first through n-th results of comparison with respect to said modulus number m to produce a modulo-m result of calculation which takes one of said zeroth through $(m-1)$-th codes in the absence of said m-th code in said first through n-th results of comparison and which, otherwise, takes said m-th code;
- error detecting means coupled to said calculating means and responsive to said binary output signal for detecting with reference to said modulo-m result of calculation whether or not an error takes place in said binary output signal, to produce a detection result signal representative of either presence or absence of said error.

28. A logic circuit as claimed in claim 27, wherein said error detecting means comprises:
- local modulo-m code production means responsive to said binary output signal for producing a modulo-m result estimation code calculated from said binary output signal with respect to said modulus number m;
- result coincidence means coupled to said calculating means and said local modulo-m code production means for checking either coincidence or incoincidence between said modulo-m result of calculation and said modulo-m result estimation code to produce a modulo-m coincidence signal which takes one of said zeroth through $(m-1)$-th codes on occurrence of said coincidence and said m-th code on occurrence of said incoincidence and on appearance of said m-th code in either one of said modulo-m result of calculation and said modulo-m result estimation code; and producing means coupled to said result coincidence means for producing said detection result signal.

29. A logic circuit as claimed in claim 28, wherein said producing means comprises:
   first means coupled to said result coincidence means for producing, as a part of said detection result signal, one of said zeroth through (m−1)-th codes in the absence of said error and said m-th code in the presence of said error; and
   second means coupled to said first means for producing, as another part of said detection result signal, a single bit signal appearing on appearance of said m-th code.

30. A logic circuit as claimed in claim 28, said binary output signal being divisible into a first significant part and a second significant part which are placed at higher and lower digits of said binary output signal, respectively, wherein said local modulo-m code production means comprises:
   a first section responsive to said first significant part for producing a first partial modulo-m result estimation code calculated from said first significant part; and
   a second section responsive to said second significant part for producing a second partial modulo-m result estimation code calculated from said second significant part, said first and said second partial modulo-m result estimation codes being produced as said modulo-m result estimation codes;
   said result coincidence means comprising:
   first subtraction means coupled to said second section and said calculating means for subtracting said second partial modulo-m result estimation code from said modulo-m result of calculation to produce a first modulo-m difference signal representative of a first modulo-m difference between said modulo-m result of calculation and said second partial modulo-m result estimation code, said first modulo-m difference taking one of said zeroth through said m-th codes;
   second subtraction means coupled to said first section and said modulo-m result of calculation for subtracting said first partial modulo-m result estimation code from said modulo-m result of calculation to produce a second modulo-m difference signal representative of a second modulo-m difference between said modulo-m result of calculation and said first partial modulo-m result estimation code, said second modulo-m difference taking one of said zeroth through m-th codes;
   first local coincidence means coupled to said first section and said first subtraction means for detecting whether said first partial modulo-m result estimation code is coincident with said first modulo-m difference signal to produce a first partial coincidence signal representative of either coincidence or incoincidence between said first partial modulo-m result estimation code and said first modulo-m difference signal;
   second local coincidence means coupled to said second section and said second subtraction means for detecting whether said second partial modulo-m result estimation code is coincident with said second modulo-m difference signal to produce a second partial coincidence signal representative of either coincidence or incoincidence between said second partial modulo-m result estimation code and said second modulo-m difference signal, said first and said second partial coincidence signal being produced as said modulo-m coincidence signal.

31. A logic circuit as claimed in claim 28, said binary output signal being divisible into a first significant part and a second significant part which are placed at higher and lower digits of said binary output signal, respectively, wherein said local modulo-m code production means comprises:
   a first section responsive to said first significant part for producing a first partial modulo-m result estimation code calculated from said first significant part; and
   a second section responsive to said second significant part for producing a second partial modulo-m result estimation code calculated from said second significant part, said first and said second partial modulo-m result estimation codes being produced as said modulo-m result estimation codes;
   said result coincidence means comprising:
   local subtraction means coupled to said calculating means and said second section for subtracting said second partial modulo-m result estimation code from said modulo-m result of calculation to produce a local modulo-m difference signal representative of a modulo-m difference between said modulo-m result of calculation and said second partial modulo-m result estimation code; and
   local coincidence means coupled to said first section and said local subtraction means for detecting whether or not said first partial modulo-m result estimation code is coincident with said local modulo-m difference signal to produce a coincidence signal representative of a result of coincidence between said first partial modulo-m result estimation code and said local modulo-m difference signal.

* * * * *